United States Patent
Li et al.

(10) Patent No.: US 11,046,062 B2
(45) Date of Patent: Jun. 29, 2021

(54) EXTRUDED PRE-STRETCHED POLYETHYLENE FILMS

(71) Applicant: Inteplast Group Corporation, Livingston, NJ (US)

(72) Inventors: Jyh-Yao Raphael Li, Parsippany, NJ (US); Kelvin Yang, Madison, NJ (US); Nancy (Lan-Shin) Cheng, Port Lavaca, TX (US)

(73) Assignee: Inteplast Group Corporation, Livingston, NJ (US)

( * ) Notice: Subject to any disclaimer, the term of this patent is extended or adjusted under 35 U.S.C. 154(b) by 202 days.

(21) Appl. No.: 16/237,019

(22) Filed: Dec. 31, 2018

(65) Prior Publication Data

US 2019/0202185 A1 Jul. 4, 2019

Related U.S. Application Data

(60) Provisional application No. 62/611,720, filed on Dec. 29, 2017.

(51) Int. Cl.
*B32B 27/32* (2006.01)
*B32B 7/035* (2019.01)
(Continued)

(52) U.S. Cl.
CPC .......... *B32B 27/32* (2013.01); *B29C 48/0018* (2019.02); *B29C 48/0022* (2019.02);
(Continued)

(58) Field of Classification Search
CPC ..... B29K 2023/06; B32B 27/32; B32B 7/035; B32B 2553/00; B32B 27/205; B32B 3/26; B29C 48/28; B29C 48/0018; B29C 48/0022; B29C 48/21; B29C 48/022; B29C 48/17; B29C 48/175; B29C 48/19;
(Continued)

(56) References Cited

U.S. PATENT DOCUMENTS 4,076,785 A * 2/1978 Schmidt ................ B29C 55/023
264/146
4,377,616 A * 3/1983 Ashcraft ................. B32B 27/08
428/213

(Continued)

*Primary Examiner* — Jeffrey M Wollschlager
(74) *Attorney, Agent, or Firm* — Stinson LLP

(57) ABSTRACT

A method of making a pre-stretched plastic packaging film comprising co-extruding a top layer, a bottom layer, and a core layer into a multilayer film intermediate product, wherein the top layer and bottom layer comprise at least about 95 wt % polyethylene resin, and the core layer comprises polyethylene resin and filler particles; stretching the multilayer film intermediate product to impart cavitation in the core layer in the area of the filler particles to form a pre-stretched polyethylene-based film; and rolling the pre-stretched polyethylene-based film onto a roller to form a roll of pre-stretched polyethylene-based film. A multilayer pre-stretched plastic packaging film comprising: a core layer sandwiched between a top layer and a bottom layer wherein the top layer and bottom layer comprise at least about 95 wt % polyethylene, and the core layer comprises filler particles having a particle size of 0.1 to 20 μm in a polyethylene-based matrix comprising at least about 95 wt % polyethylene.

14 Claims, 3 Drawing Sheets

(51) Int. Cl.
    *C08L 23/06*     (2006.01)
    *B29C 48/00*     (2019.01)
    *B29C 48/21*     (2019.01)
    *B29C 48/28*     (2019.01)
    *C08K 3/013*     (2018.01)

(52) U.S. Cl.
    CPC ............ *B29C 48/022* (2019.02); *B29C 48/21* (2019.02); *B29C 48/28* (2019.02); *B32B 7/035* (2019.01); *C08L 23/06* (2013.01); *B29K 2023/06* (2013.01); *B32B 2553/00* (2013.01); *C08K 3/013* (2018.01); *C08K 2201/005* (2013.01)

(58) Field of Classification Search
    CPC ... B29C 48/20; C08L 23/06; C08K 2201/005; C08K 3/013
    See application file for complete search history.

(56) References Cited

U.S. PATENT DOCUMENTS

| | | | |
|---|---|---|---|
| 6,228,505 B1 * | 5/2001 | Agent | B32B 27/20 |
| | | | 428/516 |
| 6,361,875 B1 * | 3/2002 | Karaoglu | B32B 27/32 |
| | | | 428/213 |
| 2005/0064160 A1 * | 3/2005 | Watson | B29C 48/705 |
| | | | 428/212 |
| 2014/0265059 A1 * | 9/2014 | Helmy | B29C 48/92 |
| | | | 264/555 |
| 2016/0279913 A1 * | 9/2016 | Manrique | B29C 48/21 |
| 2017/0129228 A1 * | 5/2017 | Middlesworth | B32B 27/36 |
| 2018/0272671 A1 * | 9/2018 | Ambroise | B32B 27/302 |

\* cited by examiner

US 11,046,062 B2

EXTRUDED PRE-STRETCHED POLYETHYLENE FILMS

REFERENCE TO RELATED APPLICATION

This application claims priority to U.S. provisional patent application 62/611,720 filed Dec. 29, 2017, the entire disclosure of which is expressly incorporated herein by reference.

FIELD OF THE INVENTION

The present invention generally relates to polyethylene-based films which have been subjected to a stretching operation prior to delivery to the ultimate user, and to a method for manufacturing such films. Such films are known in the industry most commonly as pre-stretch films, and are also sometimes referred to more literally as pre-stretched films, which is the term used in this application. These are also known as hand films or hand stretch films because they are especially suited for manual wrapping applications, as they require less energy to apply.

BACKGROUND OF THE INVENTION

A pre-stretched film is stretched close to its ultimate break point prior to being wound onto a roll. This means the film requires less stretching by the user, and less stretching energy, than with a standard stretch film to achieve the same wrapping force. Pre-stretched films are therefore popular for manual wrapping applications.

SUMMARY OF THE INVENTION

Briefly, therefore, the invention is directed to a method of making a pre-stretched plastic packaging film comprising co-extruding a top layer, a bottom layer, and a core layer into a multilayer film intermediate product, wherein the top layer and bottom layer comprise at least about 95 wt % polyethylene resin, and the core layer comprises polyethylene resin and filler particles; stretching the multilayer film intermediate product to impart cavitation in the core layer in the area of the filler particles to form a pre-stretched polyethylene-based film; and rolling the pre-stretched polyethylene-based film onto a roller to form a roll of pre-stretched polyethylene-based film.

In another aspect, the invention is directed to a method of making a pre-stretched plastic packaging film comprising co-extruding a top layer, a bottom layer, and a core layer into a multilayer film intermediate product, wherein the core layer in the multilayer film intermediate product comprises alternating segments, when viewed in cross-section relative to a machine direction of the film, of i) filler-free segments comprising at least about 95 wt % polyethylene resin, and ii) filler-containing segments comprising about 2 to about 40 wt % filler particles having a particle size of between about 0.1 and about 20 μm in a polyethylene-based resin matrix comprising at least about 95 wt % polyethylene; cutting the multilayer film intermediate product into multilayer film intermediate product segments by cutting lengthwise parallel to a machine direction of the film; stretching the multilayer film intermediate product segments in a machine direction to increase a length of the intermediate multilayer film product segments in the machine direction by between 100% and 600% and to impart cavitation in the core layer in the area of the filler particles to form pre-stretched polyethylene-based film segments; and rolling the pre-stretched polyethylene-based film segments onto rollers to form rolls of pre-stretched polyethylene-based film.

The invention is also directed to a multilayer pre-stretched plastic packaging film comprising a core layer sandwiched between a top layer and a bottom layer; wherein the top layer and bottom layer comprise at least about 95 wt % polyethylene; and the core layer comprises filler particles having a particle size of 0.1 to 20 μm in a polyethylene-based matrix comprising at least about 95 wt % polyethylene.

Other objects and features will be in part apparent and in part pointed out hereinafter.

DETAILED DESCRIPTION OF PREFERRED EMBODIMENTS

The film of the invention is a pre-stretch polyethylene (PE) film that includes interior cavitation regions that increase the film yield by decreasing the film density, thereby reducing the PE material requirements for a film of given dimensions. The yield of a film of this type can be characterized as so many square inches of area for a film of a given thickness per pound of PE, or in$^2$/lb (m$^2$/kg in metric units). For example, one pound of PE extruded into a film of thickness 16 microns will typically yield a given film area X in in$^2$. This invention increases the yield to more than 1.1x, such as to more than 1.2x, or up to about 1.7x, for example. The invention accomplishes this by replacing a portion of the bulk film interior with cavitation comprising low density filler material and void space.

Figure 1:
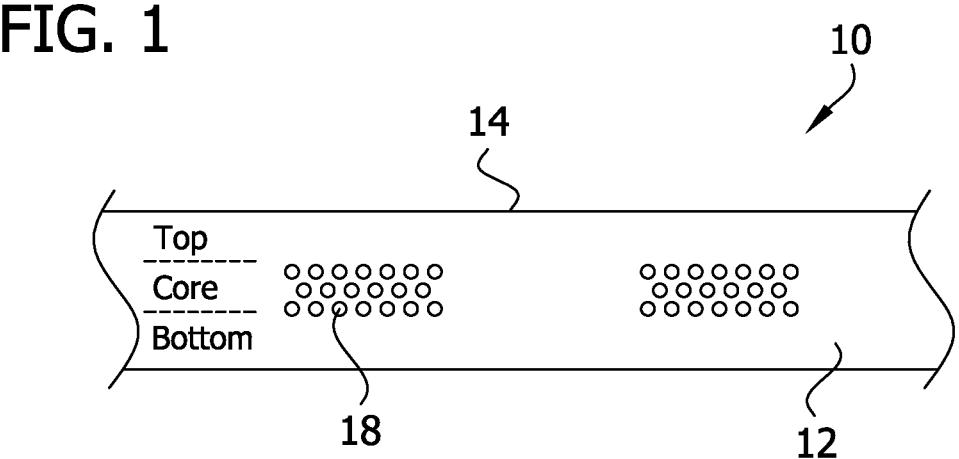
FIG. 1 is a schematic illustration of a film extruding according to the invention.

FIGS. 1 through 6 are end view cross-sectional views that demonstrate the manufacturing method of the invention. FIG. 1 is an end view of the film shown in cross-section, as the film is extruded in a machine direction toward the viewer. Film 10 includes a PE body defined between top surface 14 and bottom surface opposite from and parallel to the top surface. Within the film bulk body there are bulk PE regions 12 and filler particles 18. The film is co-extruded with top, bottom and core layers, as indicated in FIG. 1. The top and bottom layers may be extruded from separate extruders, or from the same extruder if these layers have the same composition as each other. The core layer is extruded from two extruders, one which extrudes the section of the core layer that includes the plastic resins with fillers 18 as shown in FIG. 1; and the other extruder which extrudes the sections to the left and right of the section that includes the fillers 18, that is, the other extruder which extrudes the solid plastic core sections. The process includes extruding different materials through a single die with orifices arranged so that the extrudates merge and weld together into a laminar structure. After extrusion, the film is then chilled and rolled onto a jumbo roller for holding as an intermediate product in the process of the invention; or fed directly to a subsequent manufacturing operation as described below.

Figure 2:
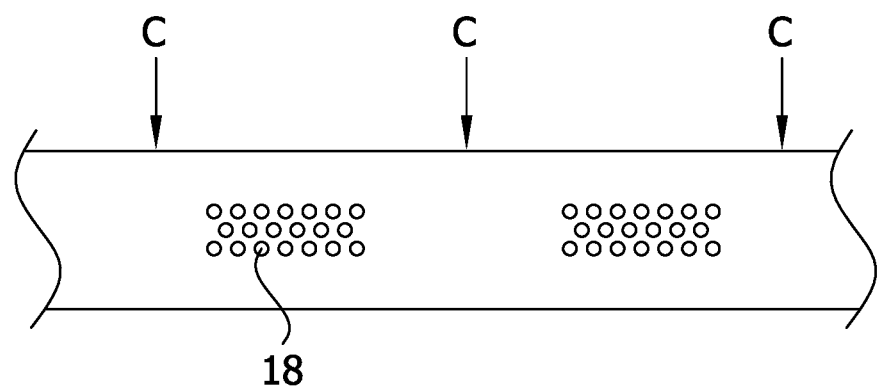
FIG. 2 is a schematic illustration of a film indicating cut lines to segregate the film into multiple segments.
Figure 3:
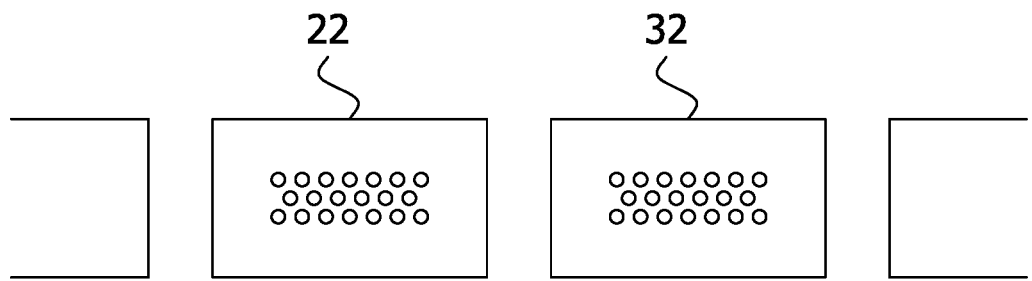
FIG. 3 is a schematic illustration of a film of the invention after slicing into multiple segments.

The next step in the process is cutting the film lengthwise in the machine direction at cut locations C illustrated in FIG. 2. This yields individual multilayer film intermediate product segments 22, 32, etc. shown in FIG. 3. Because the slices at C are performed through thicknesses of the film that do not intersect the fillers 18, the fillers are completely enclosed within the film bulk. Because the fillers are completed enclosed within the bulk PE regions 12, the film maintains good tear strength. In other words, before cutting, when viewed in cross-section relative to a machine direction of the film, the film has filler-free segments and filler-containing segments. The cutting is performed through filler-free segments. In this context, "filler-free" refers to the fact that these segments contain no fillers or at least so low of a content (e.g., <1 wt %) of the inorganic/organic fillers used to impart voiding in the filler-containing segments that there is less than 1% induced cavitation volume upon stretching. The multiple lengths of film resulting from this cutting operation are then optionally rolled onto rollers and stored as smaller rolls until it is time for stretching; or fed directly to stretching.

Figure 4:
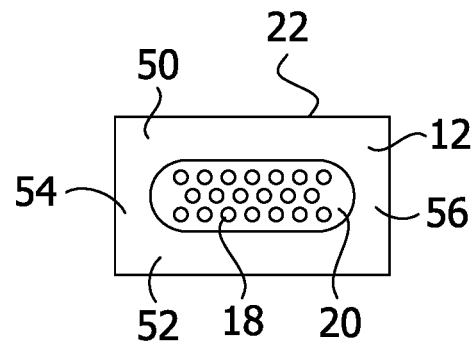
FIG. 4 is a schematic illustration of a film of the invention after stretching and cavitation.

The individual film segments such as 22 in FIG. 4 are stretched in the machine direction at a temperature below the PE melting temperature, which causes delamination of interfaces between the filler particles 18 and PE bulk region 12, thus producing cavitation volumes comprising the PE particles 18 within void spaces 20 as shown in FIG. 4. In one embodiment, for example, the film is stretched at a temperature between about ambient temperature and about 120° C. The amount of stretch imparted is between about 100% and about 600%, such as between about 200% and about 400%. In a preferred embodiment, the stretching in the machine direction is the only pre-stretching applied to the film. The solid edge sections to the left and right of the filler permit edge folding of the film as disclosed, for example, in U.S. Pat. No. 8,475,349. Areas 50 and 52 constitute continuous skin layers that protect the film from tears that might initiate from the top and bottom surface of the film. Areas 54 and 56 are continuous PE edge layers that protect the film from tears that might initiate along edges of the film.

It is alternatively contemplated to stretch the film prior to cutting the film into segments. In this alternative, stretching yields a pre-stretched polyethylene-based film which is then subsequently subjected to the cutting operation. The cutting operation then yields pre-stretched polyethylene-based film segments. Stretching a wider film prior to cutting, however, requires greater force, and can be more difficult to stretch uniformly.

Figure 5:
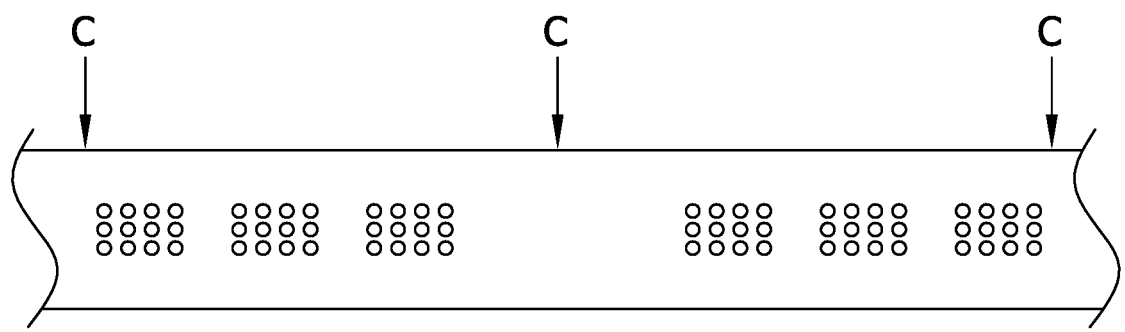
FIG. 5 is a schematic illustration of an alternative embodiment of a film extruded according to the invention.
Figure 6:
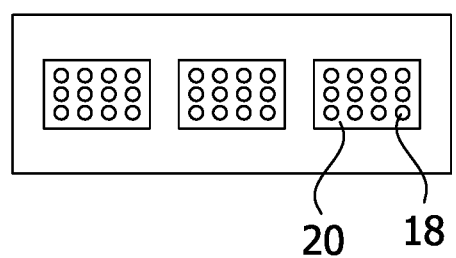
FIG. 6 is a schematic illustration of an alternative embodiment after slicing, stretching and cavitation.

FIGS. 5 and 6 illustrate a preferred embodiment of the invention in which the filler materials are extruded into sets of multiple narrow strips, such as sets of three strips as shown in FIG. 5, before slicing the film into film segments at C in FIG. 5. Then the ultimate film segment after stretching has the arrangement as schematically illustrated in FIG. 6, with void space 20 and filler particles 18.

As a general proposition, the thickness of film before stretching is in the range of about 5 to about 40 um, such as between about 10 and about 30 um. The top and bottom layers each constitute about from about 5 to about 25% of the total thickness, and the core layer as shown in FIGS. 1 and 5 that constitutes the depth of plastic that includes the filler particles constitutes from about 50 to about 90% of the overall thickness. After stretching and cavitation, depending on the percentage and size of fillers used and percentage of stretching, the density of the area that includes the void space 20 and filler particles 18 in FIG. 4 is about 50 to about 95% of the density of PE. The overall width of the cavitation area as viewed in FIG. 4 is between about 50 and about 98% of the overall width of the film segment 22. The cumulative width of the multiple (three) cavitation areas as viewed in FIG. 6 is between about 50 and about 95% of the overall width of the film segment. The overall finished film segment as shown in FIGS. 4 and 6 has a density which is between about 55% and about 98%, for example, of the density (e.g., 0.925 g/cm$^3$) of a film of the same PE-based material without the filler particles and cavitation.

The PE material used in extruding the films of the invention is PE plus optional conventional additives. For example, the material is LLDPE or a blend of PE materials, plus optional additives. The material used to extrude the filler-free top and bottom layers, as well as the filler-free core segments, for example, preferably comprises at least about 95 wt % PE material, plus optional additives. The material used to extrude the core segments that include the filler particles preferably comprises between about 2 and about 40 wt % filler particles, with the remainder being PE resin and optional additives.

The filler materials are inorganic particles such as calcium carbonate, talc, mica, or the like; or organic particles such as Nylon, PMMA (polymethyl methacrylate). The particle size of the filler materials is in the range of about 0.1 to about 20 μm.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

The invention claimed is:

1. A method of making a pre-stretched plastic packaging film comprising:

co-extruding a top layer, a bottom layer, and a core layer into a multilayer film intermediate product, wherein the top layer and bottom layer comprise at least about 95 wt % polyethylene resin, and the core layer comprises polyethylene resin and filler particles;

stretching the multilayer film intermediate product to impart cavitation in the core layer in the area of the filler particles to form a pre-stretched polyethylene-based film; and rolling the pre-stretched polyethylene-based film onto a roller to form a roll of pre-stretched polyethylene-based film;

wherein the core layer in the multilayer film intermediate product comprises alternating segments, when viewed in cross-section relative to a machine direction of the film, of filler-free segments and filler-containing segments; the method further comprising:

cutting the multilayer film intermediate product into multilayer film intermediate product segments by cutting through filler-free segments lengthwise parallel to a machine direction of the film prior to said stretching, said stretching therefore comprising stretching of the multilayer film intermediate product segments.

2. The method of claim 1 wherein the filler-free segments comprise at least about 95 wt % polyethylene resin and the filler-containing segments comprise 2 to 40 wt % filler particles in a resin matrix comprising at least about 95 wt % polyethylene resin.

3. The method of claim 1 wherein the stretching the intermediate multilayer film product segments comprises increasing a length of the intermediate multilayer film product segments in the machine direction by between 100% and 600%.

4. The method of claim 3 wherein the stretching comprises increasing said length by between 200 and 400%.

5. The method of claim 1 wherein the filler particles are inorganic particles having a particle size of between about 0.1 and about 20 μm.

6. The method of claim 1
wherein said rolling comprises rolling the pre-stretched polyethylene-based film segments onto rollers to form rolls of pre-stretched polyethylene-based film.

7. The method of claim 1 wherein the tiller particles are organic particles having a particle size of between about 0.1 and about 20 μm.

8. A method of making a pre-stretched plastic packaging film comprising:
co-extruding a top layer, a bottom layer, and a core layer into a multilayer film intermediate product, wherein the top layer and bottom layer comprise at least about 95 wt % polyethylene resin, and the core layer comprises polyethylene resin and filler particles;
stretching the multilayer film intermediate product to impart cavitation in the core layer in the area of the filler particles to form a pre-stretched polyethylene-based film; and
rolling the pre-stretched polyethylene-based film onto a roller to form a roll of pre-stretched polyethylene-based film;
wherein the core layer in the multilayer film intermediate product and in the pre-stretched polyethylene-based film comprises alternating segments, when viewed in cross-section relative to the extrusion direction, of filler-free segments and filler-containing segments; the method further comprising:
cutting the pre-stretched polyethylene-based film into pre-stretched polyethylene-based film segments by cutting through filler-free segments lengthwise parallel to a machine direction of the film after said stretching.

9. The method of claim 8 wherein the filler-free segments comprise at least about 95 wt % polyethylene resin and the filler-containing segments comprise 2 to 40 wt % filler particles in a resin matrix comprising at least about 95 wt % polyethylene resin.

10. The method of claim 8 wherein the filler particles are organic particles having a particle size of between about 0.1 and about 20 μm.

11. The method of claim 8 wherein the stretching the intermediate multilayer film product segments comprises increasing a length of the intermediate multilayer film product segments in the machine direction by between 100% and 600%.

12. The method of claim 11 wherein the stretching comprises increasing said length by between 200 and 400%.

13. The method of claim 8 wherein the filler particles are inorganic particles having a particle sixe of between about 0.1 and about 20 μm.

14. The method of claim 8 wherein said rolling comprises rolling the pre-stretched polyethylene based film segments onto rollers to form rolls of pre-stretched polyethylene-based film.

\* \* \* \* \*